UNITED STATES PATENT OFFICE 2,563,630

MELAMINE-FORMALDEHYDE RESINOUS COMPOSITIONS AND PROCESS OF PRODUCING SAME

Henry P. Wohnsiedler, Darien, and Walter M. Thomas, Stamford, Conn., assignors to American Cyanamid Company, New York, N. Y., a corporation of Maine No Drawing. Application June 7, 1946, Serial No. 675,296

4 Claims. (Cl. 260—67.6)

This invention relates to melamine-formaldehyde condensation products and to clear, unfilled thermosetting plastics derived from them.

In the field of molded, thermosetting, amino type plastics much effort has been expended in the study of condensation reactions which would yield molding compounds having the necessary properties for the formation of clear colorless objects. Many of the processes which have been described particularly in the urea-formaldehyde field have met with little success for the reason that the objects formed proved relatively unstable. Generally these crazed or cracked due to stresses developed in the piece during the molding operation or a use period subsequent thereto. Relatively poor resistance to sharp humidity changes was a notable weakness of these materials.

Molded products in general derived from melamine and formaldehyde have outstanding properties. Not only do they have excellent water resistance but they are dimensionally stable over a wide range of temperature and humidity and characterized by extreme hardness. For purposes of electrical insulation they have met very severe demands in properties of both dielectric strength and arc resistance. These plastics have been largely developed in conjunction with reinforcing fillers. The object of the present invention is to realize these outstanding properties in unfilled molded forms while at the same time realizing transparency for various utilitarian purposes and decorative effects.

In the highly developed art of plastic molding, various forming processes are in current use for thermosetting compounds. Each offers certain advantages. Of chief importance are compression including lamination and transfer molding methods. Each process requires certain inherent properties of plasticity in the molding compound for successful operation. In the transfer process, the molding compound is placed in a pot forming part of the heated die and a plunger acting on the material in the pot forces it through an orifice into the die cavity where the plastic undergoes further chemical changes causing it to set and become rigid. A rather long period of flow prior to setting is required in this type of molding operation contrasted with compression-type molding in which the charge is placed in the cavity of the die and the die closed directly on it, or laminates which are bonded between heated plates under pressure. In the processes to be described control of the plasticity, adapting it to individual molding processes is visualized.

Not only is a certain type of plasticity required for successful plastic molding by each of these processes but it is necessary to restrict the variations that might ordinarily occur in successive lots of a molding compound to meet the limitations of pressure imposed in ordinary commercial fabrication into molded parts. Therefore, in the manufacture of a molding compound, the process must have practicable features which are readily adapted to control both from the standpoint of its chemical nature as well as the process equipment available.

The molding materials which are revealed herein are designed for clear, colorless moldings having outstanding properties of heat and electrical resistance. Ordinarily, asbestos-filled materials are preferred for purposes of thermal and electrical insulation. It is recognized however, that this class of materials has limitations in regard to flow properties and ease of fabrication. One of the serious limitations to the available class of clear molded plastics—the thermoplastics—is their lack of heat resistance. Despite certain outstanding properties of electrical resistance, their deficiency in thermal properties has prevented widespread usage for purposes of electrical insulation where heat resistance is also required.

In the preparation of suitable compounds it is preferable to effect reaction of melamine and formaldehyde in aqueous solution under definite conditions and then in a series of steps to selectively dehydrate to a product suitable for laminating or sufficiently hard to be ground or treated otherwise to convert it to a suitable form for die molding. From the examples to be described, the preferred working conditions will be apparent. Of chief importance for the successful operation of the process is the maintenance of the proper degree of hydrogen ion concentration measured in terms of pH. All pH values unless otherwise described refer to measurements with the glass electrode at 25° C.

Considerable variation in the proportions of melamine and formaldehyde are possible. For example, the reaction may be operated within the range expressed by molar proportions of 1–6 of formaldehyde to 1 of melamine. Products derived from the highest ratio of formaldehyde to melamine possess, to a lesser degree, the outstanding water and heat resistance obtained from the lower ratio products.

It will be noted in the course of the following, that the polymerization and dehydration are effected under alkaline conditions in the range of pH 8.0 to 11.0, and preferably within the range of pH 9.0 to 10.0. Lesser alkalinity or even acidity may be employed during the reaction in the preparatory stage, but it requires some degree of control; accordingly, it is recommended that the higher alkalinity be employed throughout the complete process of condensation and polymerization. When this higher range of alkalinity is employed, the process is quite fool-proof in operation, and compositions obtained lend themselves to the production of articles having greater freedom from stresses than otherwise. The products may be polymerized further by tray heating at temperatures of 100–125° C., or at higher temperatures if spray drying is employed, to obtain characteristics for laminating and die molding resins.

The foregoing are described more fully in the following examples, given by way of illustration and not in limitation.

EXAMPLE 1

Trimethylol melamine was prepared by mixing 384 parts by weight of 37% formaldehyde solution, 88 parts of water, and adjusting the mixture with sodium hydroxide to a pH of 9.0 (thymol blue). To this mixture was added 179 parts of melamine and the resultant mixture heated to reflux. As soon as reflux was reached, the solution was cooled to 60° C. and 125 additional parts of water were added. Thereafter cooling was continued to 10–20° C., the pH being maintained at 9.0. The crystalline product obtained was centrifuged and dried at 50° C. A 5% solution of this material showed a glass electrode pH of 8.9. The material obtained in this manner was granulated and heated in an oven for progressively longer periods of time and at different temperatures prior to molding. The various products were then molded by direct compression molding at a temperature of 155° C. and 4,000 lbs./sq. in. for 10 minutes. The properties of these compounds are tabulated as follows:

Table I

| Heat Treatment | Solubility of Resin in Water | Molded Specimen | | |
|---|---|---|---|---|
| | | Power Factor 60 Cycles | Mold Shrinkage, Mils/In. | Aging Shrinkage, Mils/In. |
| | Per cent | | | |
| 5 hr.–100° C | 15.3 | 0.12 | 16.0 | 9.0 |
| 24 hr.–100° C | 3.2 | 0.029 | 15.2 | 7.0 |
| 1 hr.–100° C | } 2.2 | 0.015 | 10.5 | 7.3 |
| 2 hr.–125° C | | | | |

Aging shrinkage was determined by an accelerated test in which pieces were heated 24 hours at 220° F.

The foregoing example illustrates this process and products obtained therefrom wherein the starting materials are a monomeric melamine compound and formaldehyde. It has been found advisable, however, to employ a slightly polymerized product as a starting material. Accordingly, a resin, slightly hydrophobic in nature, prepared under alkaline conditions is preferably employed as a starting material, although one may be prepared under slightly alkaline conditions with appropriate control methods and conditions. A satisfactory, slightly polymerized, starting material may be prepared in the following manner.

EXAMPLE 2

310 parts of melamine and 600 parts of a 37% formaldehyde solution were adjusted with sodium hydroxide and the mixture heated to approximately 75° C., at which point the pH was 7.5. As this temperature is approached, tests are made for hydrophobicity, and when several drops of the solution added to water at 5° C. produce cloudiness, the desired polymerization for hydrophobicity is obtained. This product is suitable as a starting material. To further polymerize the product, the pH is adjusted to 9.5 (glass electrode) with sodium hydroxide, and the syrup concentrated under vacuum with a rising temperature to 115° C. The reaction product was removed from the vessel in a fluid condition and forcibly cooled. The resin obtained in this manner hydrophobed on 25% dilution.

The resin thus obtained was heated for successively longer periods at different temperatures according to the procedure of Example 1. The various products obtained in this manner were then molded according to the procedure outlined in Example 1. The improvement in the physical properties obtained by using these materials are illustrated in the following table:

Table II

| Heat Treatment | Solubility of Resin in Water | Power Factor 60 Cycles | Mold Shrinkage, Mils/In. | Aging Shrinkage, Mils/In. |
|---|---|---|---|---|
| | Per cent | | | |
| 2 hr. 100° C | 12 | .053 | 11.8 | 3.9 |
| 1 hr. 100° C | } 11 | .009 | 9.7 | 3.3 |
| 1 hr. 125° C | | | | |

EXAMPLE 3

A resin was prepared, according to the procedure outlined in the above examples, wherein the molecular ratio of formaldehyde to melamine was 2:1 instead of the ratio of 3:1 employed in the above examples. The properties of the molded products obtained from this resin are illustrated in the following table:

Table III

| Heat Treatment | Solubility of Resin in Water | Power Factor 60 Cycles | Mold Shrinkage, Mils/In. | Aging Shrinkage, Mils/In. |
|---|---|---|---|---|
| | Per cent | | | |
| 2 hr. 100° C | 26 | .084 | 11.5 | 7.5 |
| 5 hr. 100° C | 12 | .048 | 11.3 | 4.1 |

During the course of polymerizing resin intermediates of the type described as well as during the final cure of the actual molding operation, a condition of alkalinity is desirable to a degree that the pH of a water extract made from 10 parts of the compound and 100 cc. of water is between 8 and 11, and preferably between 9 and 10. For this purpose, various alkaline buffer agents such as mono, di and triethanolamines, diethyl ethanol amines, and the alkali earth metallic hydroxides and carbonates serve very well.

To illustrate this feature, the following example is given:

EXAMPLE 4

A partly hydrophobic resin prepared according to the procedure described in the first part of Example 2 was dry blended in a finely divided state with 1% of its weight of diethyl ethanol amine and tray heated at 100° C. As the period of heating continued, polymerization occurred to a progressively higher degree. The original unheated material flowed too freely and failed to set in a mold within a reasonable time. When heated for six hours, however, it could be molded by closing the mold at once without any mold preheating. After six and one-half hours of heating, a disc was molded having a water absorption of only 0.41% during a 30-minute boil, after which the piece showed no signs of cracking.

The resins and alkaline buffers may be mixed and heated at temperatures from 100–125° C. as illustrated, or they may be blended in a Banbury mixer or on heated rolls until the mass has reached the setting point. Thereafter they may be crushed to size, and in this form are suitable for direct compression molding.

EXAMPLE 5

A molding resin was prepared by mixing 512 parts 37% formaldehyde solution, 386 parts of melamine at a temperature of 80° F. and adjusted with sodium hydroxide to a pH of approximately 7.0. The slurry was heated to reflux, 30 to 40 minutes being required to raise the temperature to this point; the pH was then checked and adjusted to between 8.0 to 9.0. At this point, the material was slowly cooled to approximately 176° F. and held to that temperature while viscosity tests were made. When the reaction syrup reached a viscosity at 25° C. of 45–50 seconds (Stormer) the syrup was adjusted in pH to approximately 9.5 and spray dried. The spray drying conditions are such as to produce a product which has a viscosity of 21–28 centipoise at 20° C., a pH at 25° C. of 8.5–9.5, and hydrophobicity at 15–25% dilution. The specific conditions may vary considerably depending to a large extent upon the type dryer, the character of the syrup, the rate of feed, and on atmospheric temperature and relative humidity.

This resin was then dehydrated by heating between 100 and 125°, as in the foregoing examples, and could then be molded directly in the form of clear, transparent pieces. Alternatively, by adjusting the spray drying conditions, the syrup may be dried and the resin dehydrated in a single step.

Because of the excellent electrical properties, these resins are outstanding for the combination of this property with other properties, which include excellent hardness, heat resistance, good flexural strength, and dimensional stability. Accordingly, these resins are particularly adapted for use as clear molded resins in decorative as well as utilitarian fields wherein the combination of electrical and mechanical properties are essential.

EXAMPLE 6

A laminating composition was prepared by the procedure outlined in Example 5 above. However, when preparing a laminating composition, the reaction was continued only to the point where the viscosity was 50–60 seconds at 25° C., the pH adjusted to approximately 9.5 and spray dried under conditions to produce a product having the following characteristics: a viscosity of 25–35 centipoise at 20° C., a pH of 8.5–9.5, and hydrophobicity at 20–30% dilution. A laminate, prepared with this resin, exhibited excellent mechanical and electrical properties.

As in the case of the molding compositions, it is advisable to add an alkaline buffer to the laminating compositions. Resins of the type prepared by Example 6 were buffered with ethyl phenyl ethanol amine, diethyl ethanol amine, triethanol amine and other similar alkaline buffers in varying quantities from 0.5 to 5.0% of the resin to produce laminating syrups. 7.0 mil. alpha stock paper sheets were impregnated with each syrup containing 50% resin solids. These impregnated sheets were air-dried for 90 minutes and then oven dried, at 130° C. for 30 minutes. The sheets were then assembled in stacks of 8–10 and bonded by pressing at 1200 lbs./sq. in. for 30 minutes at a temperature of 135° C. The laminates prepared in this manner exhibited a water absorption at 15 minutes boil of .40 to .50% and at 24 hours at 25° C. of .3 to .9%. They exhibited Dynstat physical test properties of a bend angle 5 to 6°, impact strength, approximately 10 to 14 kg. cm./cm./cm.$^2$, and a flexural strength of 1250 to 1600 kg./cm.$^2$. They exhibited good electrical properties at 60 cycles, having a dielectric constant of approximately 7.5–8.5, and a power factor of approximately 0.035 to 0.090.

Molding resins of the type described yield clear, water-white molded specimens. In the preparation of molding compositions, various other components may be added for special purposes. For example, mold lubricants such as the conventional metallic stearates may be ground with the resin in which case the molded specimens become translucent. Coloring matter such as dyes or pigments may likewise be added.

We claim:

1. In a process for making a thermosetting resin, the step comprising heating a substantially dry melamine-formaldehyde reaction product at a pH of 8–11, for a period of time and at a temperature varying between about ½ hour at 130° C., and 24 hours at 100° C., wherein said reaction product comprises melamine and formaldehyde in a mol ratio of 1:1–1:6, respectively, reacted under slightly alkaline conditions and dehydrated at a pH of 8–11 to remove substantially all unbound water.

2. In a process for making a molding composition suitable for clear molded plastic, the step comprising heating a substantially dry melamine-formaldehyde condensation product at a pH of 8–11, for a period of time and at a temperature varying between about 2 hours at 125° C., and 24 hours at 100° C., wherein said reaction product comprises melamine and formaldehyde in a mol ratio of 1:2–1:3, respectively, reacted under slightly alkaline conditions and dehydrated at a pH of 8–11 to remove substantially all unbound water.

3. In a process for making a molding composition suitable for clear molded plastic, the step comprising heating a substantially dry melamine-formaldehyde reaction product at a pH of 9–10, for a period of time and at a temperature varying between about 2 hours at 125° C., and 24 hours at 100° C., wherein said reaction product comprises melamine and formaldehyde in a mol ratio of 1:2–1:3, respectively, reacted under slightly alkaline conditions and dehydrated at a pH of 9–10 to remove substantially all unbound water.

4. A thermosetting resin prepared according to the process of claim 1.

HENRY P. WOHNSIEDLER.
WALTER M. THOMAS.

REFERENCES CITED

The following references are of record in the file of this patent:

UNITED STATES PATENTS

| Number | Name | Date |
|---|---|---|
| 2,197,357 | Widmer et al. | Apr. 16, 1940 |
| 2,199,803 | Light | May 7, 1940 |
| 2,318,560 | Ripper | May 4, 1943 |
| 2,327,968 | Ripper | Aug. 24, 1943 |
| 2,407,599 | Auten et al. | Sept. 10, 1946 |
| 2,409,906 | Scott | Oct. 22, 1946 |
| 2,423,428 | Pollard | July 1, 1947 |

FOREIGN PATENTS

| Number | Country | Date |
|---|---|---|
| 116,283 | Australia | Mar. 2, 1944 |